(12) United States Patent
Vigil

(10) Patent No.: US 7,571,663 B2
(45) Date of Patent: Aug. 11, 2009

(54) ROTARY SHIFTER

(76) Inventor: Harold Vigil, 107 Erie St. East, Blauvelt, NY (US) 10913

( * ) Notice: Subject to any disclaimer, the term of this patent is extended or adjusted under 35 U.S.C. 154(b) by 219 days.

(21) Appl. No.: 11/262,073

(22) Filed: Oct. 29, 2005

(65) Prior Publication Data

US 2007/0137358 A1    Jun. 21, 2007

(51) Int. Cl.
*F16H 59/04*   (2006.01)
*G05G 1/10*    (2006.01)

(52) U.S. Cl. ........................ 74/473.3; 74/553

(58) Field of Classification Search ............... 74/473.3, 74/473.31, 473.32, 473.34, 532, 335, 519, 74/522.5, 473.1, 553, 501.6

See application file for complete search history.

(56) References Cited

U.S. PATENT DOCUMENTS

| | | | |
|---|---|---|---|
| 3,326,315 A | 6/1967 | Richards | |
| 3,766,793 A | 10/1973 | Knop | |
| 3,767,880 A * | 10/1973 | Austin | 200/318 |
| 3,844,180 A | 10/1974 | Williams et al. | |
| 3,901,097 A | 8/1975 | Williams et al. | |
| 5,156,243 A | 10/1992 | Aoki et al. | |
| 5,862,715 A * | 1/1999 | Lemire | 74/553 |
| 6,564,661 B2 * | 5/2003 | DeJonge | 74/335 |
| 6,647,822 B2 * | 11/2003 | Ritchie et al. | 74/473.31 |
| 2005/0139030 A1 * | 6/2005 | Shimamura et al. | 74/473.12 |
| 2006/0037424 A1 * | 2/2006 | Pickering et al. | 74/473.3 |

* cited by examiner

*Primary Examiner*—Thomas R Hannon
*Assistant Examiner*—Justin Krause

(57) ABSTRACT

A rotary shifting device is provided for use with an automatic transmission of a motor vehicle. The rotary shifter device includes a rotary shifter handle that is a flat disc. A cavity is located in the center of the lower side. A positioning probe extends from the lower side of the rotary shifter handle. A rocker is located within the cavity in the rotary shifter handle. A rotary shifter positioner is secured to the top plate of an enclosure in which a rotary shifter assembly is located and which transfers the rotary motion of the handle to a push and pull motion of an actuating bar which is connected to a transmission to provide gear selection. The rotary shifter positioner includes a groove with two slots at one end for park and reverse. The rotary shifter handle tips on the rocker to permit movement of the rotary shifter handle to permit placement of the positioning probe into one of the slots while preventing access to the slots by merely rotating the rotary shifter handle.

10 Claims, 6 Drawing Sheets

ROTARY SHIFTER

BACKGROUND OF THE INVENTION

1. Field of the Invention

This device relates to shifting devices for automobiles with automatic transmissions and, more specifically, to a rotary shifting device actuated by rotary motion for use in motor vehicles.

Although not known to have ever been sold as part of a automobile or other motor vehicle, various patents have dealt with the use of a rotary shifter device by which selection is achieved by turning a rotary shifter handle which is a knob rather than moving a lever or pushing a button.

2. Prior Art

The Richards Patent, U.S. Pat. No. 3,326,315, appears to be the initial teaching of a rotary gear selector for an automobile. A tag is mounted on the shaft which pushes and pulls a pair of cables connected to an automatic transmission.

The Knot Patent, U.S. Pat. No. 3,766,793 teaches a rotary shifter which uses a vacuum to actuate the gear selection but which provides for linkage usage should the vacuum fail.

The Williams et al Patent, U.S. Pat. No. 3,844,180, teaches a rotary shifter which rotates on a pulley and belt arrangement to provide for gear selection.

The Williams et al Patent, U.S. Pat. No. 3,901,097, teaches a rotary shifter with associated actuator and lock mechanisms cooperating to provide a mechanical arrangement for start up in neutral and park only.

The Aoki Patent, U.S. Pat. No. 5,156,243, utilizes an actuator for driving a hydraulic valve for switching the gear selection of an automatic transmission.

OBJECTS

The objects of this invention are to provide as follows:
1. A rotary shifter for a motor vehicle which provides the ability to shift without having extraordinary strength to turn the rotary shifting device.
2. A rotary shifter that can be produced as a kit for conversion of an automobile to a rotary shifting device.
3. A rotary shifter that requires a comparatively limited number of parts to construct and is comparatively easy to install.
4. A rotary shifter that is economical to produce and to install.
5. A rotary shifting device that is dependable.

These and other objects of the present invention will become readily apparent upon further review of the following specifications and drawings;

SUMMARY OF THE INVENTION

A rotary shifter is provided for use with an automatic transmission of a motor vehicle for selecting various gear positions of the automatic transmission including park, reverse neutral and at least one drive position. The rotary shifter includes a rotary shifter handle which is a flat disc with an outer edge for turning to select a gear position.

A means is included to restrict selection of the gear positions of park and reverse until an additional movement is applied to the rotary shifter handle.

An enclosure includes a top plate, a bottom plate and support plates between the top plate and the bottom plate. The rotary shifter handle is mounted on the shaft above the top plate. An inner lever is mounted on the shaft within the enclosure and adjacent to the top surface. A rod connects the inner connector to an outer connector. There is a top lever and a lower lever. The outer connector is connected to the top lever. A lever shaft which has two ends and is mounted to rotate on a support plate. The top lever and the lower lever are mounted on the lever shaft. A bar is connected to the lower lever for connection to an automatic transmission.

BRIEF DESCRIPTION OF THE NUMERALS

| NUMERAL | DESCRIPTION |
| --- | --- |
| 11 | Center Console |
| 13 | Motor Vehicle |
| 15 | Driver's Seat |
| 17 | Rotary Shifter Assembly |
| 19 | Enclosure |
| 21 | Top Plate |
| 23 | Bottom Plate |
| 25 | Support Plate |
| 27 | Four Corners |
| 29 | Front Wall |
| 31 | Rear Wall |
| 33 | Side Walls |
| 35 | Shaft |
| 37 | Upper Bearing |
| 39 | Lower Bearing |
| 43 | Rocker |
| 45 | Rotary Shifter Handle Assembly |
| 47 | Rotary Shifter Handle |
| 49 | Rotary Shifter Positioner |
| 51 | Upper Side |
| 53 | Lower Side |
| 55 | Rotary Position Probe |
| 57 | Cavity |
| 58 | Pointer |
| 59 | Wall |
| 61 | Circumference or Outer Edge |
| 65 | Top Surface |
| 67 | Bottom Surface |
| 69 | Opening |
| 71 | Spring |
| 73 | Rocker Pin |
| 77 | Circumference or Outside Edge |
| 79 | Opening |

-continued

BRIEF DESCRIPTION OF THE NUMERALS

| NUMERAL | DESCRIPTION |
|---|---|
| 80 | Groove |
| 81 | Upper Side |
| 83 | Lower Side |
| 85 | Outer Edge |
| 87 | Two Slots |
| 89 | Counterclockwise End |
| 91 | Inner Lever |
| 93 | Wide End |
| 95 | Narrow End |
| 97 | Shaft Opening |
| 99 | Pin Opening |
| 101 | Inner Connector Opening |
| 103 | Inner Connector |
| 105 | Inner Cylinder |
| 107 | Female Thread |
| 109 | Inner Connector Bolt |
| 111 | Male Thread |
| 113 | Inner Connector Nut |
| 115 | Rod |
| 117 | Male Thread |
| 118 | End |
| 119 | Outer Connector |
| 121 | Outer Cylinder |
| 123 | Female Thread |
| 125 | Outer Bolt |
| 127 | Top Lever |
| 129 | Opening |
| 132 | Bottom Lever |
| 134 | Lever Shaft |
| 136 | Spacer |
| 138 | Pins |
| 141 | Actuating Rod |
| 143 | Bolt |
| 145 | Nut |

DETAILED DESCRIPTION OF THE PREFERRED EMBODIMENT

The term "rotary shifter handle" means the generally circular handle or knob which is rotated by hand to select a desired gear position from an automatic transmission.

The term "rotary shifter handle assembly" means the rotary shifter handle and a rocker and a shifter positioner.

The term "rotary shifter assembly" means the various parts that transmit the motion of the rotary shifter handle to an automatic transmission.

The term "rotary shifter" means the entire device including the rotary shifter handle and the rotary shifter handle assembly and the rotary shifter assembly.

Figure 1:
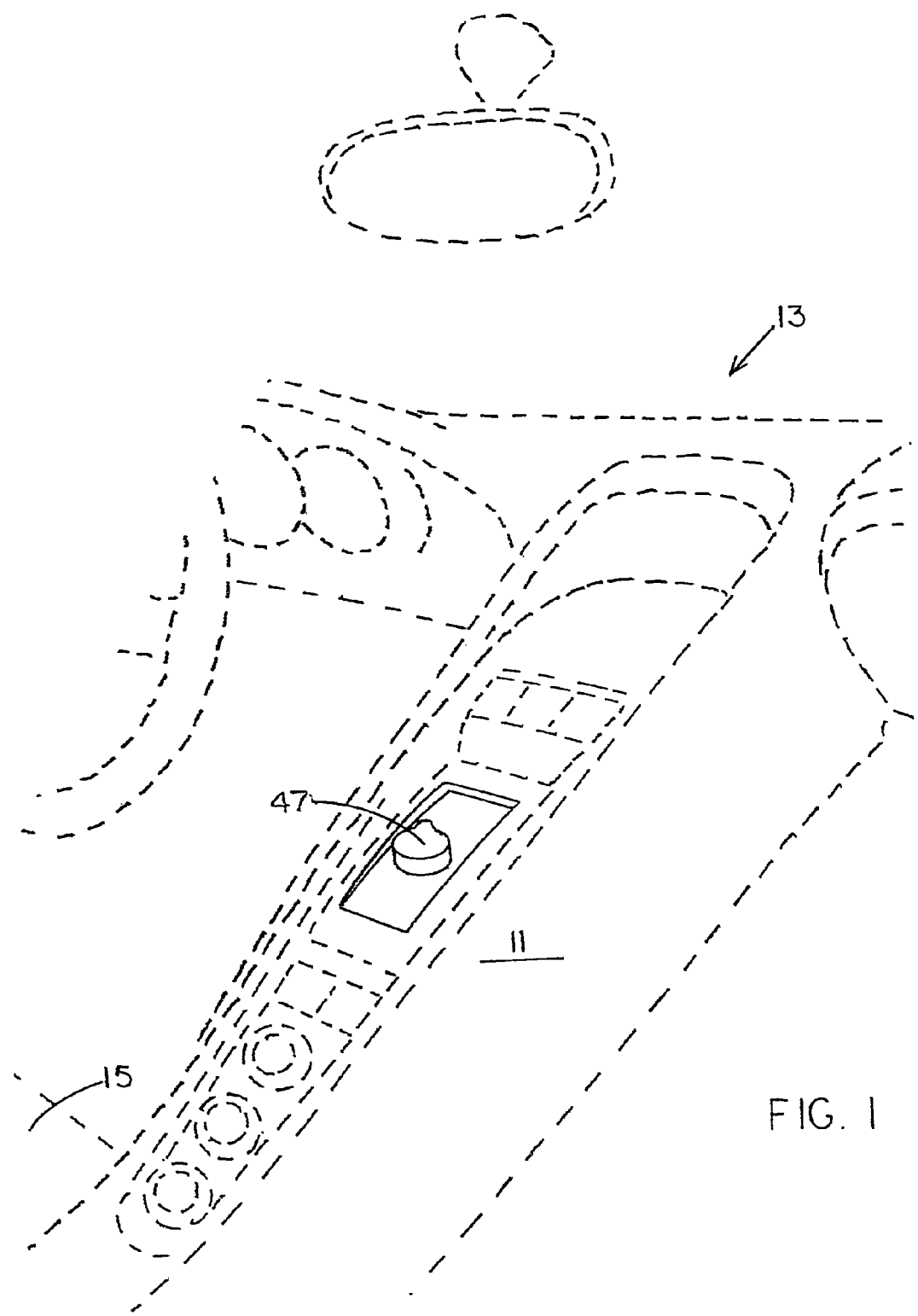
FIG. 1 is a partial perspective view of the an automobile showing the rotary shifter installed on the center console of an automobile.

As best seen in FIG. 1, the rotary shifter is preferably mounted on a center console 11 of a motor vehicle 13 at the right hand of a driver's seat 15. The rotary shifter assembly 17 is preferably decoratively mounted within the center console 11.

Figure 2:
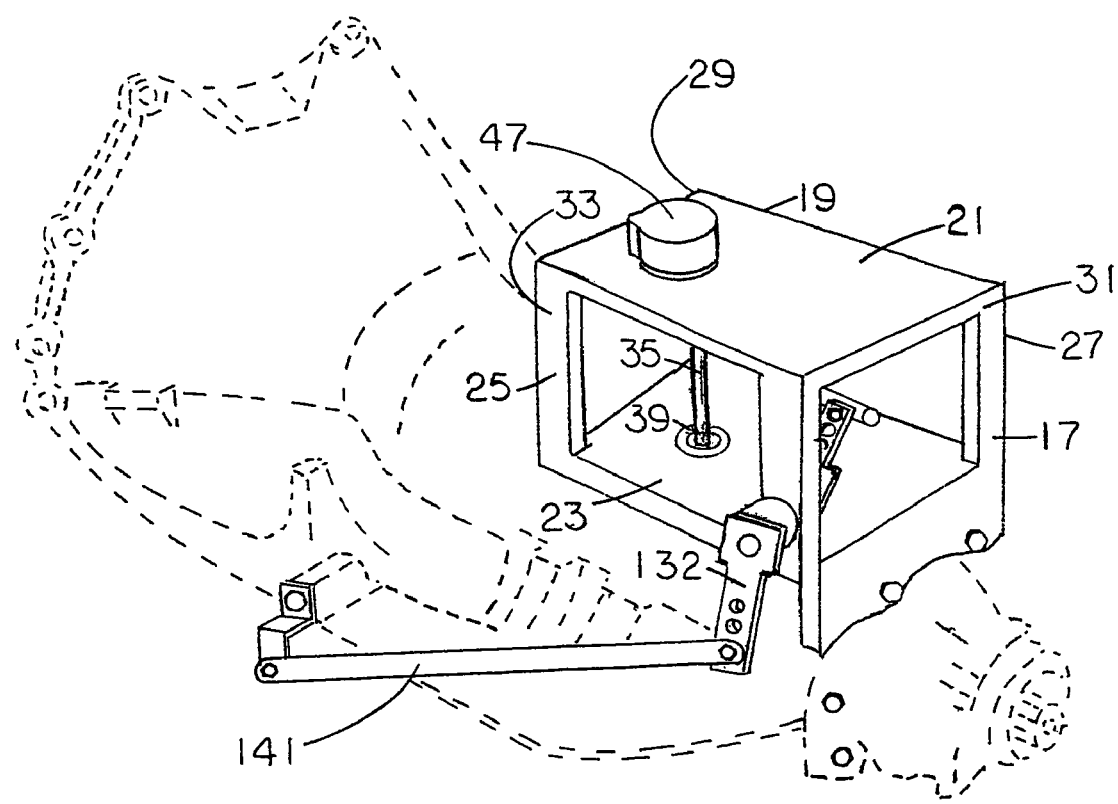
FIG. 2 is a perspective view of the rotary shifter mounted on an automatic transmission shown in broken lines.
Figure 3:
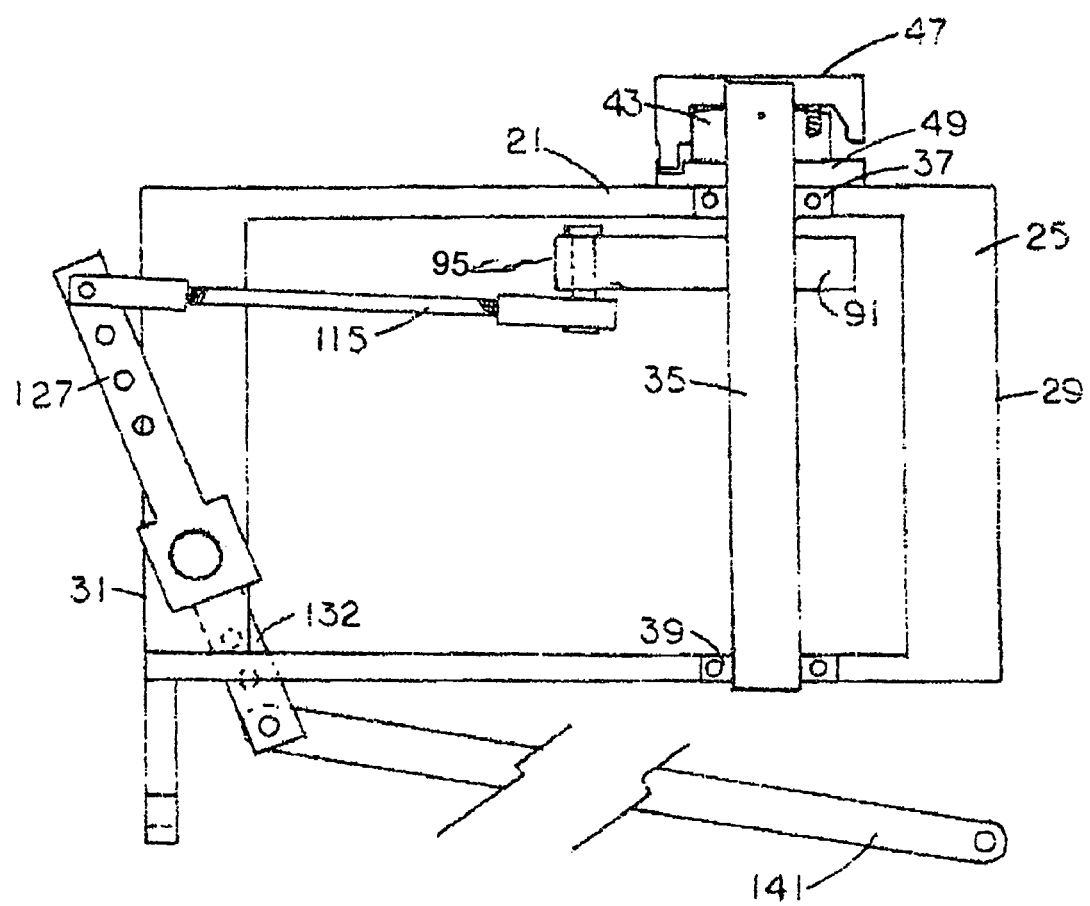
FIG. 3 is a cross-sectional view extending from the rear to the front of the rotary shifter assembly showing the rotary shifter assembly which is actuated by the rotary shifting handle.
Figure 4:
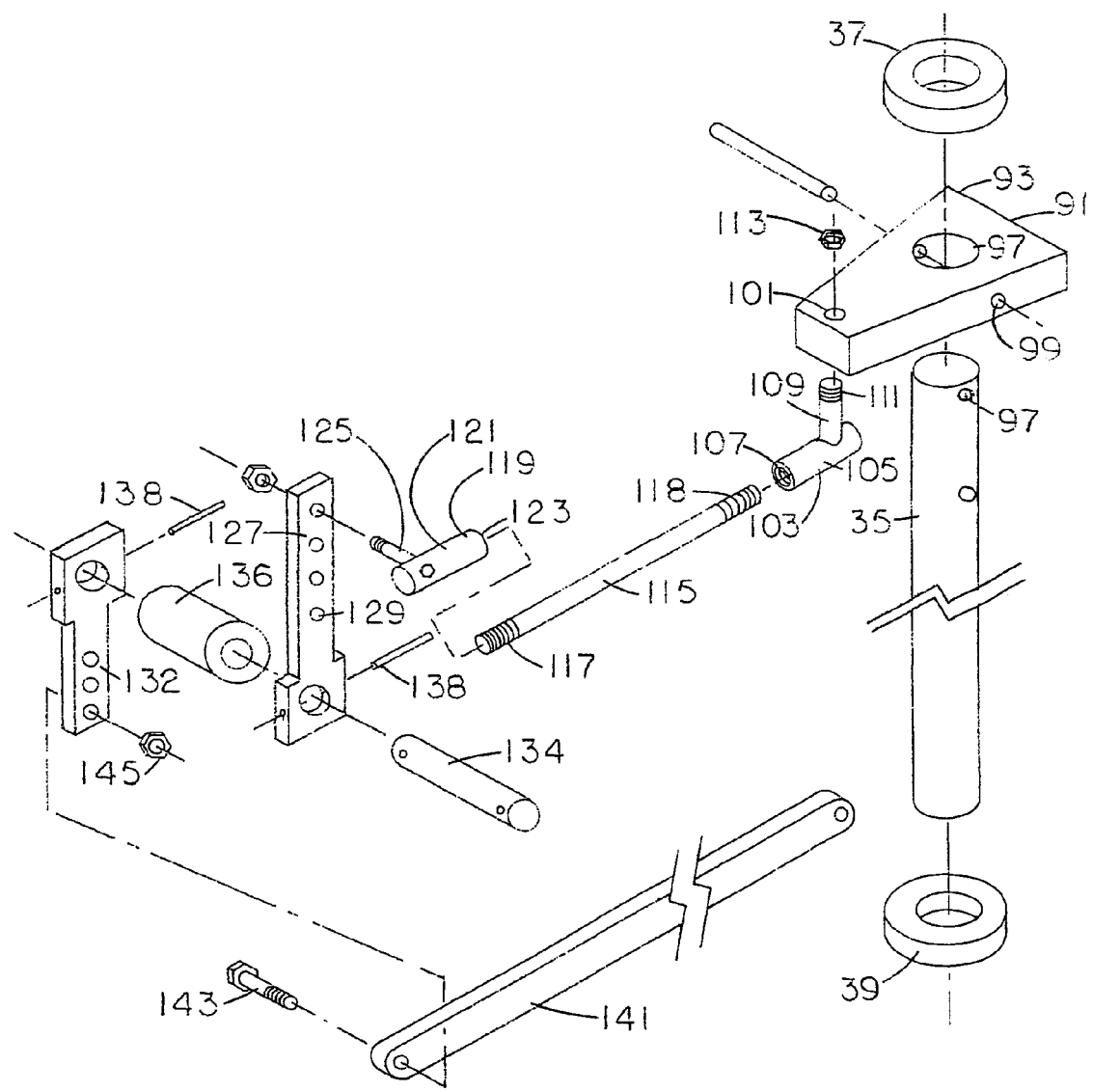
FIG. 4 is an exploded assembly view of the rotary shifter assembly shown in FIG. 3.
Figure 5:
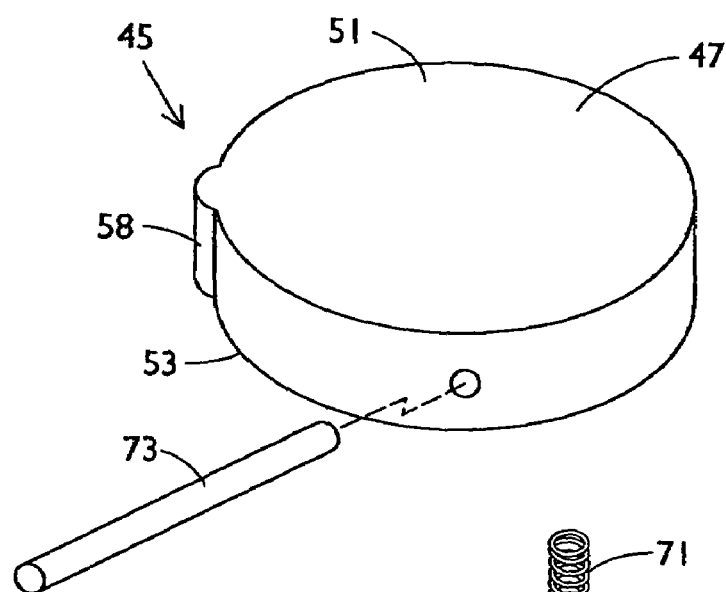
FIG. 5 is a pictorial view of the rotary shifter handle.
Figure 7:
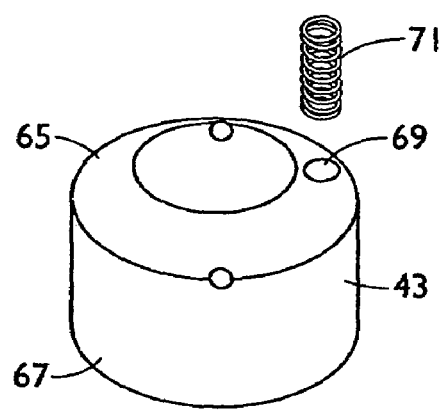
FIG. 7 is pictorial view of a rocker which is located within the rotary shifter handle.

Referring now to FIG. 2, FIG. 3 and to FIG. 4, the rotary shifter assembly 17 is shown. The rotary shifter assembly 17 includes an enclosure 19 which is part of and serves as a support for the rotary shifter assembly 17. The enclosure 19 includes a top plate 21 and a bottom plate 23 which are substantially parallel to one another and are generally maintained in a horizontal position. A support plate 25 is located in each of the four corners 27 of the enclosure 19 and extends between the top plate 21 and the bottom 23 plate to complete the enclosure 19. The front wall 29 and the rear wall 31 as well as both side walls 33 of the enclosure 19 are essentially left open but can be decoratively covered as shown in FIG. 1. The rotary shifter handle includes a pointer 58.

As seen in FIGS. 2, 3 and 4, a shaft 35 is mounted in the top plate 21 and the bottom plate 33 generally at right angles to the top plate 21 and the bottom plate 23. An upper bearing 37 is mounted to rotate in the top plate 21 and a lower bearing 39 is mounted to rotate in the bottom plate 23. The shaft 35 is mounted in the upper bearing 37 and is mounted in the lower bearing 39. As seen in FIG. 2, the shaft 35 is mounted toward but in a spaced relationship to the front wall 29 of the enclosure 19. The rotary shifter handle 47 is mounted on the shaft 35 outside of the enclosure 19 and above the top plate 21.

As is well known with all devices for gear selection used with an automatic transmission, it is essential that a motor vehicle 13 being operated in drive and being in motion should not be shifted into either reverse or into park. Therefore, there must be provision to prevent accidental shifting into either reverse or park when the motor vehicle 13 is in forward motion.

The rotary shifter is designed to prohibit erroneously shifting a motor vehicle 13 into either park or reverse.

A rocker 43 which is part of the rotary shifter handle assembly 45 is located within the rotary shifter handle 47. The rotary shifter positioner 49 is part of the rotary shifter handle assembly 45 and is located beneath the rotary shifter handle 47.

The rotary shifter handle 47 has an upper side 51 and a lower side 53. A position probe 55 extends from the lower side 53 of the rotary shifter handle 47. A cavity 57, which is generally circular, is located substantially in the center of the lower side 53 of the rotary shifter handle 47. The cavity 57 has a wall 59, which includes at least half of the periphery of the cavity 57, slopes toward the circumference or outer edge 61 and the lower side 53 of the rotary shifter handle 47. The position probe 55 extends from the lower side 53 of the rotary shifter handle 47. A pointer 58 is located on the rotary shifter handle 47.

The rocker 43, as has been stated, is located within the cavity 57. The rocker 43 is cylindrical and has a top surface 65 and a bottom surface 67. The top surface 65 is located toward the upper side 51 of the rotary shifter handle 47 but within the cavity 57. There is an opening 69 in the top surface 65 of the rocker 43 and a spring 71 is located within the opening 69. The spring 71 extends outside of the top surface 65 of the rocker 43. The rocker 43 is secured within the cavity 57 by a rocker pin 73 but the rocker pin 73 permits the rocker 43 to rotate on the rocker pin 73 against the force of the spring 71.

Figure 9:
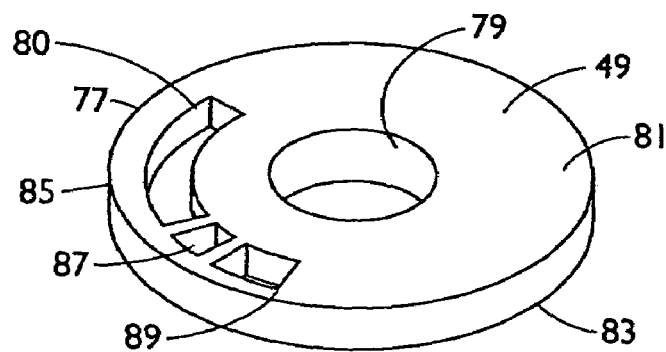
FIG. 9 is a pictorial view of a rotary shifter positioner which is engaged by the rotary shifter handle to select gear positions.
Figure 6:
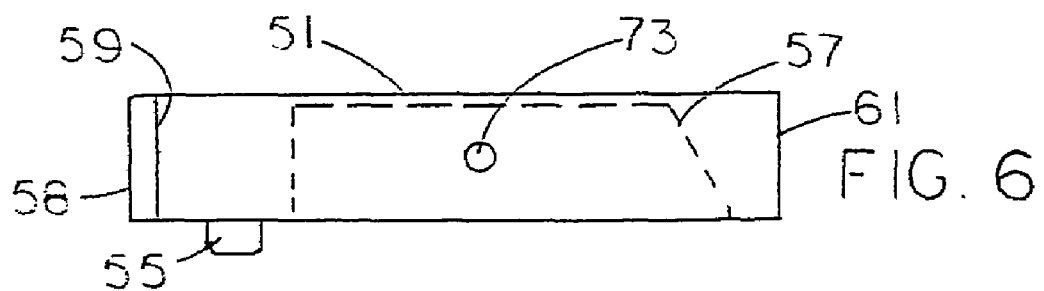
FIG. 6 is a cross-sectional view of the rotary shifter handle shown in FIG. 5.
Figure 8:
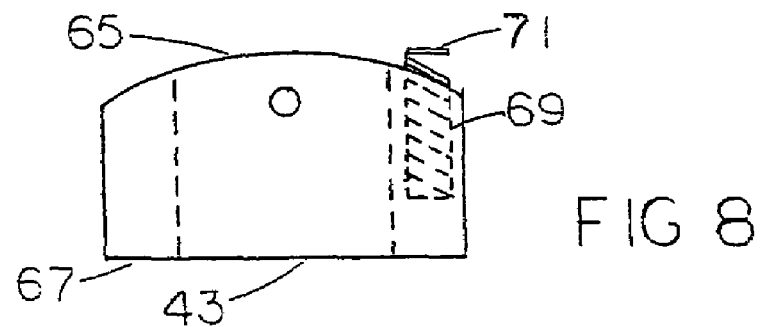
FIG. 8 is a cross-sectional view of the rocker shown in FIG. 7.
Figure 10:
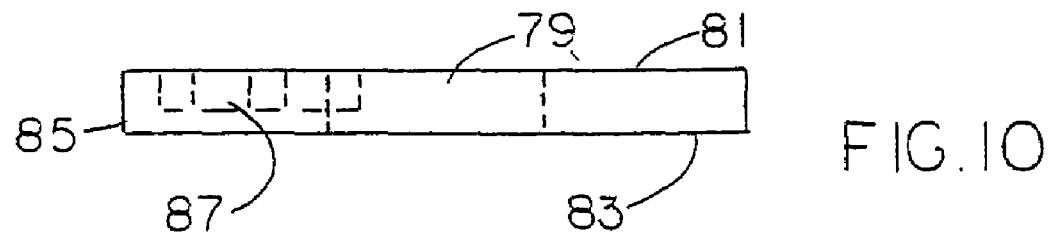
FIG. 10 is a cross-sectional view of the rotary shifter positioner shown in FIG. 9.

The rotary shifter positioner 49 is a flat plate and has a circumference or outside edge 77. There is an opening 79 in the rotary shifter positioner 49 for the shaft 35 to extend. The rotary shifter positioner 49 has an upper side 81 and a lower side 83. The lower side 83 is secured to the top plate 21. The opening 79 in the rotary shifter positioner 49 is generally located (FIG. 9) in the center of the rotary shifter positioner 49. A groove 80 is generally located on the upper side 81 of the rotary shifter positioner 49 and in a spaced relationship to a portion of the outer edge 85. As beat seen in FIG. 9, close to but within a portion of the outer groove there is a limited area 86 between the outer edge 85 and the groove 80. There are two slots 87 at the counterclockwise end 89 of the groove 80. The two slots 87 are located counterclockwise, by someone facing the groove 80.

Just below the top plate 21 (FIGS. 3 and 4) and mounted on the shaft 35 is an inner lever 91. The inner lever 91 is a flat member that has a wide end 93 and a narrow end 95. A shaft opening 97 is located through the inner lever 91 adjacent to the wide end 93. The wide end 93 provides sufficient strength about the shaft 35 which is secured in the shaft opening 97. The Inner lever 91 tapers from the wide end 93 to the narrow end 95, the narrow end 95 being smaller than the wide end 93. A pin opening 99 extends through the inner lever 91 at the shaft opening 97 and at right angles to the shaft 35, the shaft 35 being at right angles to the inner lever 91. The pin opening 99 extends across the shaft opening 97 and through the shaft 35.

At the narrow end 95 of the inner lever 91 there is located an inner connector opening 101 which is generally parallel to the shaft opening 97. The inner connector opening 101, as the shaft opening 97, is round but has a much smaller diameter than the shaft opening 97 but is generally parallel to it.

An inner connector 103 is mounted in the inner connector opening 101. The inner connector 103 is L-shaped and includes an inner cylinder 105 with a female thread 107 and an inner connector bolt 109 with a male thread 111 mounted on the inner cylinder 105 generally at a right angle to the inner cylinder 105. The inner connector bolt 109 is located in the inner connector opening 101 of the inner lever 91. The inner cylinder 105 is located directly beneath the inner lever 91 which is away from the top plate 21 and toward the bottom plate 23. An inner connector nut 113 is threaded onto the inner connector bolt 109 to retain the inner connector bolt 109 in the inner connector opening 101 while permitting the inner connector bolt 109 to rotate in the inner connector opening 101.

A rod 115, which has a male thread 117 at each end, is threaded at one end 118 into the female thread 107 of the inner connector 103. At the other end of the rod 115, the male thread 117 of the rod 115 is threaded into an outer connector 119. The outer connector 119 is substantially identical to the inner connector 113. The outer connector 119 has an outer cylinder 121 which has a female thread 123 and an outer bolt 125 which is secured to the outer cylinder 121 generally at right angles to the outer cylinder 121.

The outer connector 119 is connected to a top lever 127 and the outer bolt 125 may be placed in anyone of a series of the openings 129 in the top lever 127 depending upon the requirements of the particular transmission with which the rotary shifter is being used. The top lever 127 is a bar having a series of openings 129 along its centerline.

A bottom lever 132 is substantially identical in size and shape to the top lever 127. The bottom lever 132 and the top lever 127 are secured to one another by a lever shaft 134. A spacer 136 is mounted on the lever shaft 134 between the top lever 127 and the bottom lever 132. The top lever 127 and the bottom lever 132 are mounted on the lever shaft 134 one hundred and eighty degrees from one another. As a result, the top lever 127 and the bottom lever 132 are aligned with one another but are generally directed in opposite directions. When the top lever 127 is pointed straight up, the spacer 136 is generally horizontal and the bottom lever 132 is pointed straight down. The lever shaft 134 is mounted on the support plate 125 at the rear wall 31 of the enclosure 19. Pins 138 are used to secured to both the top lever 127 and the bottom lever 132 to the lever shaft 134.

An actuating bar 141 is connected by a bolt 143 and a nut 145 to the bottom lever 132 and the opposite end of the actuating bar 141 is connected to a transmission. By turning the rotary shifter handle 47, the actuating bar 141 is moved to select the desired gear position in the transmission.

It is to be understood that the drawings and descriptive matter are in all cases to be interpreted as merely illustrative of the principles of the invention rather than as limiting the same in any way since it is contemplated that various changes may be made in various elements to achieve the results without departing from the spirit of the invention or the scope of the appended claims.

The invention claimed is:

1. A rotary shifter for use with an automatic transmission of a motor vehicle, the rotary shifter device comprising:

a rotary shifter handle being a flat disc with a cavity in the rotary shifter handle, and an outer edge having a pointer along the outer edge, the rotary shifter handle having an upper side and a lower side, the pointer extending from the lower side a rocker located within the cavity in the rotary shifter handle, the rocker being cylindrical and having a top surface and a bottom surface, the top surface being located toward the upper side of the rotary shifter handle and having an opening in the top surface, a spring being mounted in the opening in the top surface and extending above the top surface;

a rocker pin securing the rocker in the cavity in the rotary shifter handle while permitting the rocker on the rocker pin;

a rotary shifter positioner being a fiat plate with an outside edge and having a generally central opening and also having a groove located on the upper side of the rotary shifter positioner located adjacent and in a spaced relationship to the outer edge of the shifter positioner and further having at least one slot at one end of the groove;

an enclosure including a top plate and a bottom plate, the top plate and the bottom plate being substantially parallel to one another, the enclosure having a front end and a rear end and two sides, the rotary shifter positioner being secured to the top plate adjacent the front end, the enclose including support members;

an upper bearing mounted in the top plate and having a lower bearing mounted in the bottom plate, a shaft being mounted to rotate in the upper bearing and the lower bearing and extending above the top plate, the rotary shifter handle being affixed to the rocker to permit the rotary shifter to lock on the rocker to lift the rotary shifter positioner to permit access to the slot at the end of the groove;

an inner lever mounted on the shaft within the enclosure adjacent to the top surface, a shaft pin extending through the inner lever and the shaft to secure the inner lever to the shaft, the inner lever having a connector opening through it remote from the shaft;

an inner connector;

an outer connector;

a top lever with two ends and an inner opening at one end and a series of smaller openings extending from the large opening to the opposite end of the top lever;

a lower lever with two ends and with a larger opening at one end and a series of smaller openings extending from the larger opening at one end and a series of smaller openings extending from the larger opening to the opposite end of the lower lever, the top lever and the lower lever being substantially identical;

a lever shaft mounted to rotate on a support member adjacent the rear end of the enclosure; the top lever and the lower lever being mounted on the lever shaft generally at one hundred and eighty degrees from one another;

a rod having two ends and being threaded at both ends, one end being connected to the inner connector and the other end being connected to the outer connector; and a bar connected to a smaller opening in the lower lever for connection to a transmission.

2. A rotary shifter according to claim 1, wherein the cavity is generally circular and at least half of the cavity has a wall which slopes toward the outer edge and toward the lower side of the rotary shifter handle.

3. A rotary shifter according to claim 1, wherein the top plate and the bottom plate of the enclosure are rectangular.

4. A rotary shifter according to claim 1, wherein the inner lever is a flat tapered plate with a wide end and a narrow end, the shaft being located at the wide end and with the inner connector being at the narrow end.

5. A rotary shifter according to claim 1, wherein the inner connector includes an inner cylinder with a female thread thereon, and an inner bolt extending generally at a right angle from the inner cylinder, the inner bolt having a male thread, the inner bolt extending through the opening at the narrow end of the inner lever, a nut being threaded on the inner bolt to secure the inner bolt to the inner lever.

6. A rotary shifter according to claim 1, wherein the outer connector includes an outer cylinder with a male thread thereon, and an outer bolt extending generally at a right angle from the outer cylinder, the outer bolt having a male thread.

7. A rotary shifter according to claim 1 wherein, the inner connector includes an inner cylinder with a female thread therein, and an inner bolt extending generally at a right angle from the inner cylinder, the inner bolt having a male thread, the inner bolt extending through the opening at the narrow end of the inner lever, a nut being threaded on the inner bolt to secure the inner bolt to the inner lever, and the outer connector including an outer cylinder with a female thread therein and an outer bolt extending generally at a right angle from the outer cylinder, the outer bolt having a male thread.

8. A rotary shifter according to claim 1 wherein the top lever and the lower lever are flat generally rectangular members.

9. A rotary shifter for use with an automatic transmission of a motor vehicle, the rotary shifting device comprising;

a rotary shifter handle being a flat disc with an outer edge and having a pointer along the outer edge, the rotary shifter handle having an upper side and a lower side, a cavity being located substantially in the center of the lower side, a positioning probe extending from the cavity, the positioning probe being located substantially in the center of the cavity, the cavity being generally circular, and wherein over at least half of a periphery of the cavity, the cavity having a wall which slopes toward the rotary shifter handle;

a rocker located within the cavity in the rotary shifter handle;

a rocker pin for securing the rocker In the cavity in the rotary shifter handle while permitting the rocker to rotate on the rocker pin;

a rotary shifter positioner being a flat circular plate with an outside edge and having a central opening and also having a groove located on the upper side of the rotary shifter positioner located adjacent and in a spaced relationship to a portion of the outside edge of the rotary shifter positioner and further having two slots at one end of the groove;

an enclosure including a top plate and a bottom plate, the top plate and the bottom plate being rectangular and having four corners and four supports between the top plate and the bottom plate, the top plate and the bottom plate being substantially parallel to one another, the enclosure having a front end and a rear end and two sides, the rotary shifter positioner being secured to the top plate adjacent the front end and generally midway between the two sides;

an upper bearing mounted in the top plate and a lower bearing located in the bottom plate, the shaft being mounted to rotate on the upper bearing and the lower bearing and extending beyond the top plate, the rotary shifter handle being affixed to the rocker to permit the rotary shifter handle to rock on the rocker to lift the positioning probe to permit access to the slot at the end of the of the groove in the shaft generally one hundred and eighty degrees from one another;

a spacer mounted on the lever shaft between the top lever and the bottom lever, the outer connector being secured to one of the smaller openings in the top lever by a nut and a bolt; and a rod having two ends and being threaded at both ends, one end being threaded into a female thread of an inner connector and the other end being into a female thread of an outer connector; and a bar connected to a smaller opening in the bottom lever for connection to a transmission.

10. A rotary shifter device according to claim 9, wherein the rocker is cylindrical and has a top surface and a bottom surface, the top surface being located toward the upper side of the rotating shifter handle, the top surface having an opening, a spring being mounted in the opening in the top surface and extending above the top surface.

* * * * *